(144.)

H. F. Chapin. Animal Poke.

No. 4,667.

Reissued Dec. 12, 1871.

Witnesses.
R. F. Osgood
Archd. Baird

Inventor:
H. F. Chapin
By Burke Fraser Osgood
attys.

AM. PHOTO-LITHOGRAPHIC CO. N.Y. (OSBORNE'S PROCESS.)

UNITED STATES PATENT OFFICE.

HARLOW F. CHAPIN, OF ROCHESTER, NEW YORK.

IMPROVEMENT IN ANIMAL POKES.

Specification forming part of Letters Patent No. 112,546, dated March 14, 1871; reissue No. 4,667, dated December 12, 1871.

*To all whom it may concern:*

Be it known that I, HARLOW F. CHAPIN, of the city of Rochester, in the county of Monroe and State of New York, have invented certain new and useful Improvements in Animal Pokes, of which the following is a specification:

This invention consists essentially in making the upper ends of the poke open and connecting the same together by means of a strap which is made capable of engagement and disengagement and which forms the bearing upon the neck of the animal. It further consists in inserting the prick-pins loosely between the girts or bearings, as will hereinafter be set forth.

Figure 1:
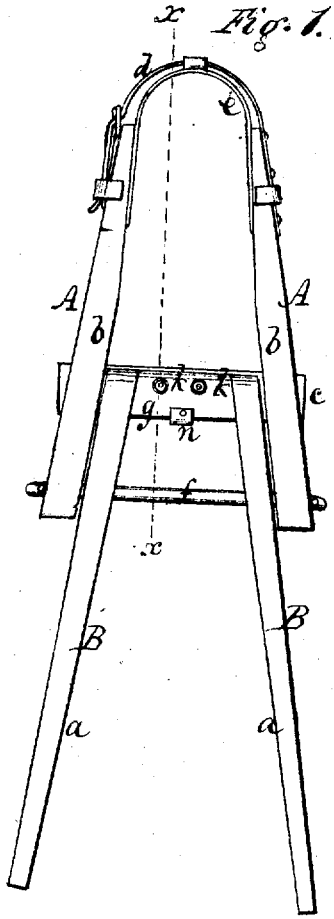
Figure 2:
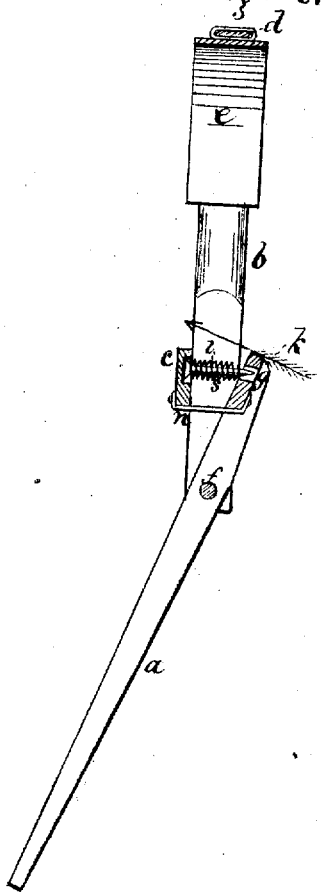

In the drawing, Figure 1, is an elevation of my improvement. Fig. 2 is a vertical section in lines *x x*.

A A represents the neck-yoke, and B B the stale of my improved poke, which are pivoted together by the rod *f*.

Heretofore the neck-yoke has been made in the form of a bow and in one piece. I make it in two parts, *a b*, open at the top and tied together toward the lower end by a cross-girt, *c*, which gives it stiffness and strength at that point. The upper portions of the bars are preferably tapered off from the inside and rounded slightly to prevent chafing. The upper or open ends of the poke are connected by a strap, *d*, which is fast at one end and coupled or buckled at the other, so as to be capable of engagement or disengagement. In applying or removing the device the strap is uncoupled or unbuckled, which leaves the end of the poke entirely open.

Several advantages result from this construction of the poke, the most important of which are as follows: It can be taken up or let out at pleasure, thereby adapting it exactly to the neck of the animal. In some cases it is desirable to carry it forward on the neck further than others, and in some cases it is necessary to adjust the pricks higher or lower. On pokes of the bow-form no adjustment can be obtained.

So far as I am aware, in pokes heretofore in use the device has to be slipped bodily over the animal's head, or else the connecting-rod, key, or other device, has to be removed and replaced, the use of which device renders the poke weak, and it is otherwise objectionable. In mine it simply fastens around the neck.

The bars *a a* of the stale rest closely within the ends of the poke, so as to give greater strength, and are connected at the top by a cross-girt, *g*, which rests opposite the girts *c*. Between these girts are placed prick-pins *i i*, which are usually headed at one end and pointed at the other. These pins are simply inserted between the girts with the pointed ends resting in the holes *k k* of the movable part. These holes or openings are made elongated, so as to allow a free play of the pins in whatever position the girt *g* may be in moving up or back. Springs *s s* are made to rest on and surround the pins resting against their heads on one side, and the girt *g* on the other, thereby keeping the pins in position and the girts properly apart. The spread of the girts, is gauged by a check-strap, *n*, or equivalent, as shown.

So far as I am aware the pins have heretofore been made fixed at their heads with the stationary or supporting parts and several different sizes have to be made. A single size in my case insures all requirements.

By connecting the two bars together by a strap capable of engaging and disengaging, the poke is easier manufactured, as waste pieces may be used for the parts *b b*, while in others the bow requires special timber, and even then a large percentage breaks in the act of bending or making. Furthermore, a strap, capable of engaging and disengaging, for connecting the two bars, is far more effective and desirable than the bow-form. The facility of applying and removing, as before described, is apparent, and the horse is less liable to be frightened than where the device is applied over his head in the old way.

In order to give greater ease a pad, *e*, of heavy leather or other material may be used under the strap, which forms a broader bearing and cushions the poke upon the neck of the animal.

I claim a special advantage in inserting the pins loosely between stationary and movable girts, and making the holes in which the points rest elongated or enlarged, as thereby a free and independent action is produced, which prevents binding in the different movements of the shield portion.

The poke is subject to considerable strain and leverage, not only vertically but also laterally, and in ordinary devices the pins frequently become bent and sometimes broken, and frequently the action of the movable shield is impaired or totally impeded by the binding of the parts. In my case no difficulty of this kind can arise, for the pins will adapt themselves to place under all circumstances.

By dispensing with the use of nuts or other parts for attaching the pins I can make my device much cheaper than the old form.

The springs *s s* serve the important purpose of keeping the pins in place by their backward pressure in addition to the ordinary one or keeping the girts apart. The prick-pins may be removed and replaced at pleasure by simply drawing the screw that holds the check-strap. It is often desirable, if the animal gets sore or when he is content to remain quiet by the use of the poke, without the pins.

This poke dispenses with all pegs, rods, &c., which are used with the old style to secure the device on the horse, and which are constantly loosing out or becoming detached.

Having thus described my invention, what I claim as new, and desire to secure by Letters Patent, is—

1. In combination with an animal poke, a connecting-strap, *d*, which is capable of engagement and disengagement, for the purpose specified.

2. The combination of the cushioning-pad *e* with a strap, *d*, and bars A A, for the purpose specified.

5. In combination with the pins *i i* and cross-girts *c g*, the spiral springs *s s*, arranged and operating substantially as and for the purpose set forth.

HARLOW F. CHAPIN.

Witnesses:
C. F. WEAVER,
R. F. OSGOOD.

(144)